United States Patent [19]

Guzy et al.

[11] Patent Number: 4,820,764

[45] Date of Patent: Apr. 11, 1989

[54] HIGH GAS OIL RATIO RESISTANT ELASTOMER

[75] Inventors: Ray L. Guzy, Tulsa; David W. Livingston, Claremore, both of Okla.

[73] Assignee: Baker Hughes Incorporated, Houston, Tex.

[21] Appl. No.: 203,040

[22] Filed: Jun. 6, 1988

[51] Int. Cl.$^4$ ............... C08L 61/00; C08L 51/00; C08L 1/00; C08K 7/14

[52] U.S. Cl. .................... 524/512; 524/12; 524/34; 524/36; 524/494; 524/521; 524/525; 524/526; 524/534; 525/166; 525/192; 525/194; 525/233; 525/236; 525/237

[58] Field of Search ........... 524/525, 36, 34, 494, 524/526, 534, 521, 12, 512, ; 525/166, 192, 194, 236-237, 233

[56] References Cited

U.S. PATENT DOCUMENTS

| | | |
|---|---|---|
| 3,678,135 | 7/1972 | Mastromatteo et al. ........... 260/889 |
| 3,909,467 | 9/1975 | Tatum ..................................... 260/8 |
| 3,926,900 | 12/1975 | Guzy et al. ....................... 260/33.6 |
| 3,939,133 | 2/1976 | Roodvoets ....................... 525/332.5 |
| 4,178,318 | 12/1979 | Cheung ................................ 428/462 |
| 4,241,132 | 12/1980 | Pratt et al. .......................... 428/901 |
| 4,275,319 | 6/1981 | Davis ................................... 428/519 |
| 4,311,759 | 1/1982 | Glennon ............................. 428/463 |
| 4,430,472 | 3/1984 | Guzy ................................... 524/483 |
| 4,499,240 | 2/1985 | Valentine ............................. 428/36 |
| 4,501,841 | 2/1985 | Herring .............................. 428/521 |
| 4,601,944 | 7/1986 | Zussman ............................ 428/901 |

OTHER PUBLICATIONS

High Vinyl 1-2 Liquid Polybutadiene Ricon, Colorado Chemical Specialties, Inc.

*Primary Examiner*—Herbert J. Lilling
*Attorney, Agent, or Firm*—Charles D. Gunter, Jr.

[57] ABSTRACT

A sulfur curable elastomeric composition is shown which exhibits improved resistance to deformation in hot, high gas content environments, such as oil and gas wells. The composition includes a conjugated diolefin polymer rubber, a low molecular weight polubutadiene and a quantity of randomly oriented flocked fibers.

6 Claims, No Drawings

HIGH GAS OIL RATIO RESISTANT ELASTOMER

BACKGROUND OF THE INVENTION

1. Field of the Invention:

This invention relates to elastomeric compositions which are useful at elevated temperatures and pressures found in oil and gas wells and to devices made from such compositions.

2. Description of the Prior Art:

High gas pressures often exist in oil and gas wells which cause rubber parts of downhole tools to blow-up or "bubble". The gas induced bubbling is apparently caused by gas permeating the rubber at high pressure, and, upon removal of the tool from the hole, the sudden reduction in pressure occurs before the gas can escape, resulting in bubbling of the rubber elastomer.

A particular problem area is in the stator component of downhole pumps used to lift oil and gas constituents from the well. The stator is a double internal helix precision molded of a synthetic elastomer which is permanently bonded in a steel housing. The stator is suspended from a tubing string and cooperates with a mating rotor which defines a sealed cavity within the pump. The rotor is driven from the surface, as by a sucker rod. As the rotor turns within the stator, the cavities progress in an upward direction. The elastomer used for the stator must be highly resistant to the most severe downhole conditions and resist delamination and bubbling.

U.S. Pat. No. 3,926,900, issued Dec. 16, 1975, to Guzy et al., teaches blends of EPDM with liquid, 1,2-polybutadiene which are peroxide cured and are surprisingly resistant to degradation at elevated temperatures and pressures within oil and gas wells. These blends are extremely useful in electrical insulating materials, particularly in wire and cable constructions.

U.S. Pat. No. 4,430,472, issued Feb. 7, 1984, to Guzy, teaches jacketing compositions for electrical wires and cables which are comprised of ethylene/acrylic elastomers which have blended therewith a liquid polybutadiene.

While the above compositions work well for their intended application, they have not successfully solved the problem of bubbling and delamination in progressive cavity pumps.

The present invention has as its object to eliminate bubbling and delamination in parts of downhole tools.

Another object of the invention is to improve the life span of downhole tools having elastomeric components when the components are used in wells having high gas to oil ratios.

SUMMARY OF THE INVENTION

The elastomeric compositions of the invention, which are useful as components of downhole tools, are sulfur curable and exhibit improved resistance to delamination in hot, high gas content environments. The elastomeric compositions comprise a conjugated diolefin polymer rubber, such as a nitrile rubber, a low molecular weight polybutadiene, and a quantity of randomly oriented flocked fiber.

Preferably, the elastomeric compositions of the invention comprise a nitrile rubber, greater than about 18 parts, per 100 parts nitrile rubber, of a polybutadiene having a molecular weight less than about 5,000 and having less than about 80% 1,2-polymerized units. The elastomeric compositions also have dispersed therein from about 5 to 30 parts, per 100 parts of nitrile rubber, of a randomly oriented flocked fiber.

Preferably, the polybutadiene is supplied as a dispersion of a low molecular weight polybutadiene on an inert filler, the polybutadiene having a molecular weight of approximately 2,000 and having a approximately 70% 1,2-polymerized units.

Additional, objects, features and advantages will be apparent in the written description with follows.

DETAILED DESCRIPTION OF THE INVENTION

The elastomeric compositions of the invention comprise a rubber of relatively high unsaturation which is blended with a low molecular weight polybutadiene and a quantity of randomly oriented, flocked fibers. The rubber of relatively high unsaturation can be defined as a conjugated diene elastomer, whether a homopolymer as in such diolefin homopolymers as polybutadiene (emulsion prepared or solution prepared), polyisoprene (natural or synthetic, emulsion prepared or solution prepare), polychloroprene, etc., or copolymers of such diolefins as butadiene or isoprene with copolymerizable monoethylenically unsaturated monomers such as styrene acrylonitrile, vinyl pyridine, ethyl acrylate, methyl methacrylate or a mixture of such monomers. Usually the copolymer contains at least 50% by weight of the diolefin. More than one such highly unsaturated rubber can be used in a blend (e.g. NR and SBR, NR and polyisoprene).

The preferred rubber of relatively high unsaturation is a nitrile rubber which is a copolymer of butadiene and acrylonitrile, or vinyl cyanide. The acrylonitrile can be produced by reacting hydrogen cyanide and acetylene, using an aqueous solution of ammonium chloride and cuprous chloride as a catalyst. The copolymerization of butadiene and acrylonitrile is carried out in an emulsion at about 40° to 75° F. and such techniques are well known in the art. For example, see "Introduction to Plastics", Lionel K. Arnold, Iowa State University Press, 1968, at page 149.

The low molecular weight polybutadiene is characterized as a low molecular weight polymer of butadiene wherein less than about 80% of the monomer units are present in the 1, 2 configuration. As is well known, 1,3-butadiene monomer may be polymerized by a variety of techniques to give polymers having a high proportion of units having 1,4 attachment in the cis trans configuration. Certain commercial techniques, based on anionic polymerization technology, are also well known whereby the 1,3-butadiene monomer may be polymerized to give polymers having a high proportion of 1,2 attachment.

Such polymers can be produced in a variety of molecular weight ranges and with varying proportions of 1,2 to 1,4 units. For the purpose of this invention, only those materials having molecular weights of less than about 10,000 grams/mole and containing not more than about 80% mole units having 1,2 attachment are preferred. The preferred materials have molecular weights which range between about 1500 to 10,000 grams/mole, preferably 1,000 to 3,000 grams/mole, most preferably 2,000 grams/mole.

A particularly preferred polybutadiene is commercially available from Colorado Chemical Specialties, Inc. of Broomfield, Colorado under the trade name "P30/D". This product is described in the literature as being a dispersion of a partly saturated polybutadiene on an inert filler, the polybutadiene having an Iodine number of 150 and a molecular weight of 2,000. The 1,2 vinyl content is approximately 70%, with 15% each cis and trans backbone unsaturation. By comparison, the polybutadiene used in U.S. Pat. No. 3,926,900, supra, has an Iodine number greater that 430 and greater than about 80% 1,2 vinyl attachment.

The preferred polybutadiene is present in the elastomeric composition of the invention in the range from about 12 to 60 parts, per hundred parts nitrile rubber, preferably greater than about 18 parts per hundred parts nitrile rubber. Compositions prepared with less than about twelve parts per hundred parts nitrile rubber have not been effective.

The sulfur curable elastomeric composition of the invention also contains about 5 to 30 parts, per hundred parts of nitrile rubber, of a randomly oriented flocked fiber. The fibers can be any of a number of non-thermoplastic materials, e.g., rayon polyesters, cotton, asbestos, glass or wool. The fibers should be able to withstand temperatures at least as high as about 200°–400° F. Mixtures of acceptable fibers of different materials can also be utilized.

The length of the fibers should be from about 1/64 inch to about ¼ inch. The desired fiber length can be obtained by chopping. Most preferably, approximately 10 parts per hundred parts nitrile rubber of the randomly oriented flocked fibers are present in the elastomeric composition.

In the preferred compositions of the invention, the proper ratio of polybutadiene to fiber must be maintained for optimum gas and deformation resistance. The preferred ratio of polybutadiene to fiber is at least about 2.0:1, with the most preferred ratio being approximately 2.5:1.

The elastomeric composition is cured by conventional practice for sulfur vulcanization, using sulfur itself or a conventional sulfur-yielding curative, in conventional amounts. Sulfur cure systems are described, for instance in U.S. Pat. Nos., 3,678,135, July 18, 1972; 3,343,582, Sept. 26, 1967; and 3,451,962, June 24, 1968.

Other conventional compounding ingredients can be present in the elastomeric composition including such activators as metal oxides or salts, fillers or pigments such as carbon black, silica, zinc oxide, extender oils, plasticizers, processing aids, lubricants, stabilizers, antioxidants, and the like.

The elastomeric composition can be prepared in conventional mixing equipment, such as a Banbury mixer or on a roll mill according to standard practice, and vulcanized in a desired shape using vulcanizing conditions appropriate to the particular article being fabricated.

The following example is intended to be illustrative of the invention:

| EXAMPLE I | |
|---|---|
| Composition A | Parts |
| Nitrile Rubber | 100 |
| Filler | 30 |
| Flocked Fiber | 10 |
| *Polybutadiene | 25 |
| Plasticizers and Processing Aids | 25 |
| Sulfur curing Agent | 10 |

*P30/D Colorado Chemical Specialties, Inc., Broomfield Colorado.

The preferred composition A shown in Example 1 was compared to compositions having varying percentages of polybutadiene, and flocked fiber and using sulfur and peroxide curing systems. The results are shown in Table I.

TABLE I

|  | Composition A | Composition B | Composition C | Composition D | Composition E |
|---|---|---|---|---|---|
| Polybutadiene | 25 | 18 | 25 | 25 | 25 |
| Flocked Fiber | 10 | 10 | 10 | 0 | 15 |
| Sulfur Cure Agent | 1 | 1 | 1 | 1 | 0 |
| Peroxide Cure Agent | 0 | 0 | 0 | 0 | 11 |
| (Durez) Phenolic Resin | 0 | 0 | 10 | 0 | 0 |
| Results: | No Bubbles No Expansion | Bubbles Expanded | Bubbles No Expansion | Bubbles Lrg. Expansion | Bubbles No Exp. |

The compositions of the invention did not bubble or expand even in high gas oil environments. The compositions have proved to be especially useful in fabricating stator components of downhole, progressive cavity pumps. The compositions of the invention provide improved gas resistance and dimensional stability even at high temperatures and in high gas oil ratio environments. The addition of the low molecular weight polybutadiene also reduces scorch, and acts as a viscosity modifier which makes the composition easier to process in injection molding difficult to fill molds, and as in the case of the long injection cavity of a progressive cavity pump. Scorchiness occurs when the viscosity of the rubber formulation is too high or too much filler is used, causing the internal temperature of the rubber to escalate. The presence of a low molecular weight polybutadiene, at greater than about 12 parts per hundred parts rubber, along with randomly oriented flocked fiber appears to have a synergistic effect in producing a superior composition for use in downhole, progressive cavity pumps.

I claim:

1. A sulfur curable elastomeric composition having improved resistance to deformation in hot, high gas content environments, comprising:
   a conjugated diolefin polymer rubber containing at least 50 percent by weight of said conjugated diolefin;
   from about 12 to 60 parts, per hundred parts conjugated diolefin polymer rubber, of a polybutadiene having a molecular weight in the range from 1,000–10,000 grams/mole and having about 70–80% 1, 2 polymerized units; and
   from about 5 to 30 parts, per hundred parts of conjugated diolefin polymer rubber, of a randomly oriented flocked fiber.

2. A sulfur curable elastomeric composition having improved resistance to deformation in hot, high gas content environments, comprising:
   a nitrile rubber;
   from about 12-60 parts, per hundred parts nitrile rubber, of a polybutadiene having a molecular weight in the range from 1,000-5000 grams/mole and having about 70-80% 1, 2 polymerized units; and
   from about 5 to 30 parts, per hundred parts of nitrile rubber, of a randomly oriented flocked fiber.

3. A sulfur curable elastomeric composition having improved resistance to deformation in hot, high gas content environments, comprising:
   a nitrile rubber;
   approximately 25 parts, per hundred parts nitrile rubber, of a polybutadiene having a molecular weight of approximately 2000 and having approximately 70% 1,2 polymerized units;
   from about 5 to 30 parts, per hundred parts of nitrile rubber, of a randomly oriented flocked fiber; and
   a sulfur curing agent.

4. The sulfur curable elastomeric composition of claim 3, wherein said polybutadiene is supplied as a dispersion of a low molecular weight polybutadiene on an inert filler.

5. The sulfur curable elastomeric composition of claim 3, wherein said randomly oriented flock fibers are non-thermoplastic material having lengths from about one sixty-fourth inch to about one-fourth inch.

6. The sulfur curable elastomeric composition of claim 5, wherein approximately 10 parts, per hundred parts nitrile rubber, of said randomly oriented flocked fibers are present in said elastomeric composition.

* * * * *